Oct. 29, 1946.  G. V. DE LERY  2,410,272
POCKET READING GLASS
Filed April 5, 1944

INVENTOR
GEORGE V. DE LERY
BY
Irving Seidman
ATTORNEY

Patented Oct. 29, 1946

2,410,272

UNITED STATES PATENT OFFICE 2,410,272

POCKET READING GLASS

George V. de Lery, New York, N. Y.

Application April 5, 1944, Serial No. 529,878

4 Claims. (Cl. 88—39)

This invention relates to reading glasses.

Broadly, it is an object of my invention to provide a reading glass with comfortable thumb and finger notches so that the reading glass can be easily held for a great length of time without tiring the user; the notches being disposed so as not to interfere with the visual field of the lens.

More particularly, it is an object of my invention to provide a reading glass or lens for easy handling as an aid to the eyes in their adjustments from distance to near-vision needs without strain and without the need for the use of spectacles. However, if spectacles are worn it will enhance the efficiency of the lens.

A further object of my lens is to eliminate the use of reading glasses which are mounted on the face, thus making it more comfortable for the reader. It is especially useful in cases of presbyopia; my lens being so designed as to clearly magnify without distortion due to spherical and chromatic aberration.

Still a further object is to provide a lens of a focal strength graduated over the entire length and width without variation of more than one-quarter of a degree from any edge, thus providing an even distribution of spreading power and presenting parallel reading lines to the eye of the user.

A further object is to provide a reading glass of a focus so that it can be held about elbow length from the eyes; the reader using both eyes to comfortably read the type without distortion or color aberration.

Heretofore, lenses have been made that do not give full vision and distort the characters so that they are not of uniform height; furthermore, such lenses have chromatic and spherical aberration and are uncomfortable and too large for easy use.

My reading glass eliminates these disadvantages; providing a pocket-sized glass of sufficient magnification evenly distributed without distortion for easy reading and eye comfort, and especialy adapted for reading of print arranged in columns.

For a fuller understanding of the nature and objects of my invention, reference is had to the following detailed description in connection with the accompanying drawing, in which.

Figure 1:
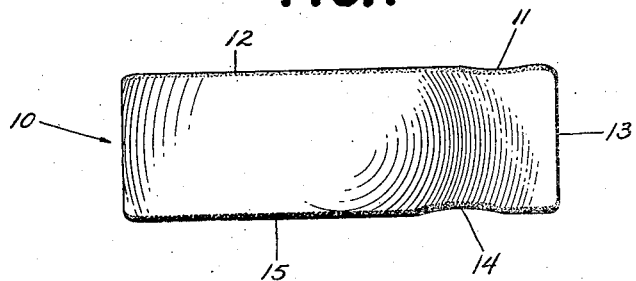
Fig. 1 is a plan view of my reading glass.

Referring to the drawing, numeral 10 represents a reading glass of rectangular shape with a finger notch 11 on one long side 12 and near one short side 13 and finger notch 14 on the opposite long side 15 and spaced further away from short side 13 than finger notch 11.

Figure 2:
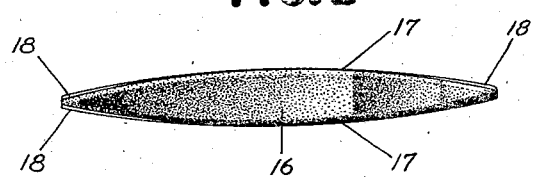
Fig. 2 is a top view thereof.

My preferred dimensions for the reading glass is the exact size shown in the drawing; that is, 3⅜" long by 1⅛" wide with notch 11 between ⅜" to ½" from short side 13 to the center of the notch, and notch 14 is ¾" to the center of the notch from short side 13. The thickness at the top (Fig. 2) in the center 16 is 10 millimeters graded towards each end in variances of 1/64 of a degree. The curvature of the glass totals 5.50 dioptres making it possible for practically any variation of a person's eyes to benefit by the different adjustments suitable to the proper reading of print.

It should be noted that the reading glass curves both longitudinally as shown at 17 and laterally as shown at 18, and is bisymmetric in shape. It is important that the glass be annealed of proper mixtures of ingredients to form a fine crown glass of a malleability and a definition in the index of refraction equal to a uniform figure of 1.5230. The glass is properly annealed before and after moulding to the shape shown under predetermined temperatures and ground and polished with the finest of abrasives.

The preferred method of holding my glass is to place the index finger in notch 11 at right angles to the glass with the thumb in notch 14 so that the glass is parallel to the reading surface as it is moved across the page.

It will be found that the reading glass will focus well about elbow length from the eye so that the forearm can pivot horizontally at the elbow and will not be tiring to the reader.

It is obvious that various changes and modifications may be made somewhat in the details of construction without departing from the general spirit of the invention, as set forth in the appended claims.

I claim:

1. A rectangular reading glass of the character described having a finger notch on each of the long sides adjacent one short side, said glass being double convex with like opposed curvatures, the faces being convex both longitudinally and transversely.

2. A rectangular reading glass of the character described having a finger notch on one long side near a short side and a finger notch on the opposite long side and near the said short side, said last named finger notch being further away from said short side than said first named finger notch, said glass being the central segment of a double convex circular lens of like opposed curvatures, the faces being convex, both longitudinally and transversely, and the optical and geometric centres and planes giving maximum and substantially equal magnification within its focal length with no distortion or chromatic aberration.

3. A rectangular reading glass of the character described having a finger notch for the index finger on one long side adjacent a short side and a finger notch for the thumb on the opposite long side and further away from said short side than said index finger notch, said glass being the central segment of a double convex circular lens of like opposed curvatures, the faces being convex, both longitudinally and transversely, and the optical and geometric centres and planes giving maximum and substantially equal magnification within its focal length with no distortion or chromatic aberration.

4. A rectangular reading glass of the character described three times longer than it is wide and substantially 5.50 dioptres having a finger notch on each of the long sides adjacent one short side, said glass being the central segment of a double convex circular lens of like opposed curvatures, the faces being convex, both longitudinally and transversely, and the optical and geometric centres and planes giving maximum and substantially equal magnification within its focal length with no distortion or chromatic aberration.

GEORGE V. DE LERY.